(12) United States Patent
Han

(10) Patent No.: US 8,050,542 B2
(45) Date of Patent: Nov. 1, 2011

(54) METHOD AND APPARATUS FOR REPRODUCING MULTIMEDIA CONTENTS, APPARATUS AND METHOD FOR CREATING MULTIMEDIA CONTENTS, AND MEDIUM FOR STORING MULTIMEDIA CONTENTS

(75) Inventor: Woo-jin Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1821 days.

(21) Appl. No.: 11/144,688

(22) Filed: Jun. 6, 2005

(65) Prior Publication Data

US 2005/0271368 A1    Dec. 8, 2005

(30) Foreign Application Priority Data

Jun. 5, 2004    (KR) .................. 10-2004-0041193

(51) Int. Cl.
*H04N 5/917*    (2006.01)
(52) U.S. Cl. .................. 386/356; 386/353; 704/500
(58) Field of Classification Search .................. 386/46, 386/96, 124–126, 200, 230, 232, 239, 353–356; 704/500; 705/14; 725/37, 81
See application file for complete search history.

(56) References Cited

U.S. PATENT DOCUMENTS

| | | | |
|---|---|---|---|
| 5,594,660 A | | 1/1997 | Sung et al. |
| 5,596,420 A | * | 1/1997 | Daum .................. 386/110 |
| 5,995,161 A | * | 11/1999 | Gadre et al. .................. 348/564 |
| 6,763,374 B1 | * | 7/2004 | Levi et al. .................. 709/217 |
| 7,103,431 B1 | | 9/2006 | Kamimura et al. |
| 7,496,236 B2 | * | 2/2009 | Fogg .................. 382/233 |
| 2002/0007357 A1 | * | 1/2002 | Wong et al. .................. 707/1 |
| 2002/0107737 A1 | * | 8/2002 | Kaneko et al. .................. 705/14 |
| 2002/0154900 A1 | | 10/2002 | Shimada |
| 2003/0025832 A1 | | 2/2003 | Swart et al. |
| 2003/0055657 A1 | * | 3/2003 | Yoshida et al. .................. 704/500 |
| 2003/0056029 A1 | * | 3/2003 | Huang et al. .................. 709/328 |
| 2003/0118158 A1 | * | 6/2003 | Hattori .................. 379/68 |
| 2005/0273825 A1 | * | 12/2005 | Eldeeb .................. 725/81 |

FOREIGN PATENT DOCUMENTS

| | | |
|---|---|---|
| EP | 1 291 850 A1 | 3/2003 |
| EP | 1 562 193 A1 | 8/2005 |
| JP | 10-023370 A | 1/1998 |
| JP | 10-327381 A | 12/1998 |

(Continued)

OTHER PUBLICATIONS

Japanese Office Action issued in Application No. 2005-164547, dated Dec. 7, 2010.
Communication from the Japanese Patent Office issued Aug. 3, 2010, in counterpart Japanese Application No. 2005-164547.

*Primary Examiner* — Thai Tran
*Assistant Examiner* — Mishawn Dunn
(74) *Attorney, Agent, or Firm* — Sughrue Mion, PLLC

(57) ABSTRACT

An apparatus and method for reproducing multimedia contents regardless of the type and version of a codec, an apparatus and method for generating multimedia contents, and a storage medium storing multimedia contents are provided. The multimedia reproducing apparatus includes: a reading unit which reads multimedia data including multimedia contents coupled with a codec for decoding the multimedia contents, from a storage medium; and a reproducing unit which reproduces multimedia contents by using the codec extracted from the read multimedia data. Regardless of codec upgrade or introduction of a new codec with a new method, various types of multimedia contents can be smoothly reproduced.

18 Claims, 4 Drawing Sheets

FOREIGN PATENT DOCUMENTS

| | | |
|---|---|---|
| JP | 2001-067807 A | 3/2001 |
| JP | 2002-057985 A | 2/2002 |
| JP | 2002-318598 A | 10/2002 |
| KR | 10-0144780 A | 4/1998 |
| KR | 2001-0083701 A | 9/2001 |
| KR | 102003-0052819 A | 6/2003 |
| WO | WO 00/67261 A1 | 11/2000 |
| WO | 0133569 A1 | 5/2001 |

* cited by examiner

METHOD AND APPARATUS FOR REPRODUCING MULTIMEDIA CONTENTS, APPARATUS AND METHOD FOR CREATING MULTIMEDIA CONTENTS, AND MEDIUM FOR STORING MULTIMEDIA CONTENTS

This application claims the priority of Korean Patent Application No. 10-2004-0041193, filed on Jun. 5, 2004, in the Korean Intellectual Property Office, the disclosure of which is incorporated herein in its entirety by reference.

BACKGROUND OF THE INVENTION

1. Field of the Invention

The present invention relates to multimedia contents, and more particularly, to an apparatus and method for reproducing multimedia contents regardless of the type and version of a codec, an apparatus and method for generating multimedia contents, and a storage medium for storing multimedia contents.

2. Description of the Related Art

Multimedia contents are formed by combining a variety of media such as text, sound, still images, moving picture media, etc. Reproduction of multimedia contents usually requires that image and voice information be processed at the same time. Because of the large amount of data to be processed, storage of multimedia contents requires a large capacity storage medium such as an optical disc. Here the optical disc may be a compact disc (CD) or a digital versatile disc (DVD). Multimedia contents may also be stored on and reproduced from a local storage such as a computer hard disc, or downloaded from a server in a remote location through a network and reproduced. For convenience of explanation, hereinafter, multimedia contents will be divided into media contents recorded on a storage medium, local contents recorded on a local storage, and remote contents downloaded through a network.

FIG. 1 is a diagram showing an apparatus for reproducing multimedia contents stored on a conventional storage medium.

Referring to FIG. 1, shown is an apparatus 110 for reproducing multimedia contents recorded on a storage medium 100 such as an optical disc, by using a hardware codec (coder and decoder) 112. Among apparatuses for reproducing multimedia contents recorded on a storage medium, a leading example is a DVD player. Multimedia contents recorded on a storage medium such as a CD-ROM, a DVD, or a video compact disc (VCD), are read into the reproducing apparatus, decoded through a hardware codec, and the decoded result is output through an output apparatus (not shown) such as a display apparatus. The hardware codec encodes or decodes multimedia contents according to a standard such as moving picture experts group (MPEG)-1, -2, -4, or DivX.

FIG. 2 is a diagram showing an apparatus for reproducing multimedia contents stored in a conventional local or remote storage medium.

Referring to FIG. 2, shown is an apparatus 210 which reproduces a multimedia contents file recorded on a local storage 200 such as a hard disc of a computer, or on an external storage 202 linked through a network, by using a software codec 212. A hardware codec can also be used depending on the design of the reproducing apparatus. The reproducing apparatus may be a desktop PC, a notebook PC, or a personal digital assistant (PDA).

FIG. 3 is a diagram for explaining a method for reproducing conventional multimedia contents.

Referring to FIG. 3, the conventional apparatuses for reproducing multimedia contents have a structure in which multimedia contents 300 are read from a storage medium, a local storage, or an external storage linked through a network, and then are decoded by using an embedded hardware codec or software codec 310 and output to a display apparatus. That is, a method for decoding multimedia contents varies with respect to the standard method and version of an embedded codec.

However, since codecs are frequently upgraded as technology develops, a compatibility problem arises. For example, in the case of DivX, which is a widely used MPEG-4-based codec, multimedia contents complying with version 5.1 cannot be reproduced by DivX version 5.0.

In particular, since a codec is installed in the form of a hardware chip as shown in FIG. 1, it is very difficult to upgrade the codec and when a new type of a codec is developed and multimedia contents based on this new codec are provided, the new contents cannot be reproduced by the previous codec.

In addition, when a software codec is used as shown in FIG. 2, the codec can be upgraded periodically through a network, or a user can directly download a unified codec. However, in this case, various types of codecs residing in one reproducing apparatus makes management of versions of codecs difficult and the user should have expert knowledge about the codecs. In addition, in a reproducing apparatus not linked to a network, the codecs cannot be upgraded.

Recently, various types of multimedia services have been provided through a variety of consumer electronics (CE) devices. In such CE devices also, it is essential to upgrade codecs, but in a CE device having relatively few resources, it is very difficult to employ a method such as software upgrade, such that when a new type of a codec is introduced, the CE device itself should be upgraded.

SUMMARY OF THE INVENTION

The present invention provides an apparatus and method for reproducing multimedia contents regardless of the type and version of a codec, an apparatus and method for generating multimedia contents, and a storage medium storing multimedia contents.

According to an aspect of the present invention, there is provided a multimedia reproducing apparatus including: a reading unit which reads multimedia data comprising multimedia contents coupled with a codec for decoding the multimedia contents, from a storage medium; and a reproducing unit which reproduces the multimedia contents by using the codec extracted from the read multimedia data.

The storage medium may include at least one optical disc, local storage, or remotely located storage.

The multimedia data may further include a header in which information on characteristics of the codec are recorded, and the reproducing unit may include a general-purpose engine which decodes the multimedia contents by using the codec with reference to the header.

The general-purpose engine may decode the multimedia contents by loading the codec into memory and executing the codec.

The codec may be implemented by a binary code or a script language describing the operation of the codec.

The script language may include Java language, and the general-purpose engine may be a Java virtual machine executing the codec implemented by Java regardless of the type of a platform or operating system.

The multimedia reproducing apparatus may be, for example, any one of a DVD player, a PC, a notebook computer, a personal digital assistant (PDA), and a consumer electronics (CE) product.

According to another aspect of the present invention, there is provided a multimedia reproducing method including: reading multimedia data comprising multimedia contents coupled with a codec for decoding the multimedia contents, from a storage medium; and reproducing the multimedia contents by extracting and using the codec from the read multimedia data.

According to still another aspect of the present invention, there is provided a multimedia generating apparatus including: a contents generation unit which encodes multimedia contents by using a codec; and a recording unit which records multimedia data including the multimedia contents coupled with the codec, in a storage medium.

According to yet another aspect of the present invention, there is provided a multimedia generating method including: encoding multimedia contents by using a codec; and recording multimedia data including the multimedia contents coupled with the codec, in a storage medium.

According to a further aspect of the present invention, there is provided a multimedia storage medium including: multimedia data including multimedia contents coupled with a codec for encoding the multimedia contents.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of an apparatus and method for reproducing multimedia contents regardless of the type and version of a codec according to the present invention will be described in detail with reference to the attached drawings.

In the multimedia contents according to the present invention, conventional multimedia contents are coupled with a codec that is appropriate to the multimedia contents. In other words, not only the multimedia contents themselves, but also the codec capable of reproducing the multimedia contents, are coupled together such that various types and versions of multimedia contents can be reproduced regardless of a reproducing apparatus.

Figure 1:
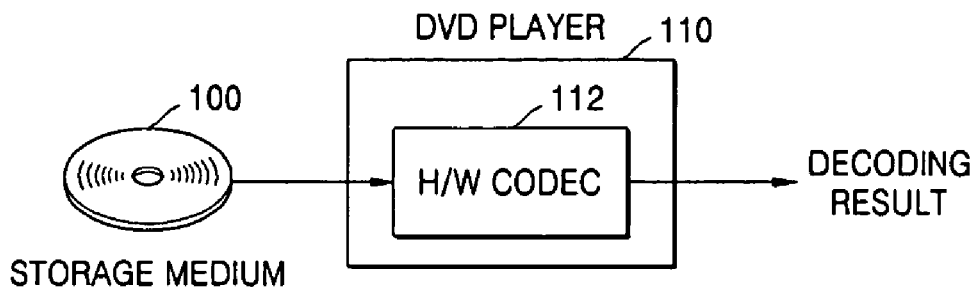
FIG. 1 is a diagram showing an apparatus for reproducing multimedia contents stored on a conventional storage medium.
Figure 2:
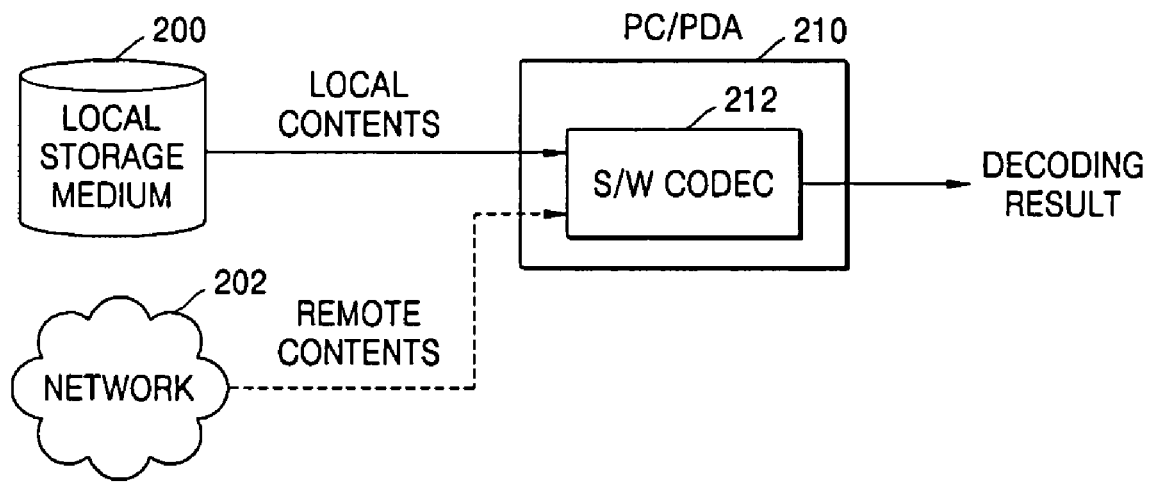
FIG. 2 is a diagram showing an apparatus for reproducing multimedia contents stored on a conventional local or remote storage medium.
Figure 3:
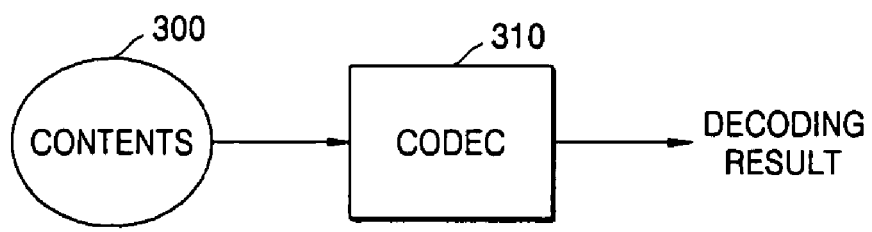
FIG. 3 is a diagram for explaining a method of reproducing conventional multimedia contents.
Figure 4:
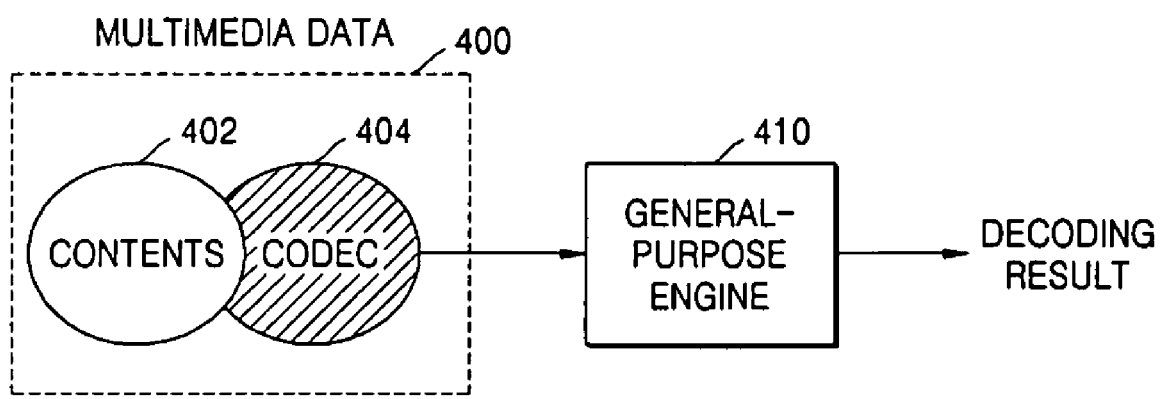
FIG. 4 is a diagram for explaining a method of reproducing multimedia contents according to an exemplary embodiment of the present invention.

FIG. 4 is a diagram explaining a method for reproducing multimedia contents according to an exemplary embodiment of the present invention.

Referring to FIG. 4, contents data 402 and a codec 404 are coupled together to make new multimedia contents 400. Since these new multimedia contents 400 can be reproduced regardless of the type and version of a reproducing apparatus, they are referred to as self-playable multimedia contents.

An apparatus for reproducing self-playable multimedia contents according to an exemplary embodiment of the present invention has a general-purpose engine 410. The general-purpose engine 410 interprets a bit format of the self-playable multimedia contents 400, predetermined according to the coupled codec type, and loads the codec into memory from a codec track to be explained later, and then uses the codec to reproduce actual multimedia contents recorded on a data track, as will be explained later. Accordingly, the problem of multimedia contents reproduction being restricted by the type and version of a codec of a conventional reproducing apparatus can be solved.

That is, the present invention is characterized in that the concept of multimedia contents is expanded from the conventional notion of including only multimedia data itself, to including multimedia data and a codec for actually decoding the multimedia contents.

Generally, while multimedia contents may be as large as hundreds of megabytes (MB), the binary code of a codec is just tens of kilobytes (KB). Accordingly, by including an optimal codec to reproduce multimedia contents, a reproducing apparatus becomes able to reproduce multimedia contents smoothly regardless of the type and version of the codec.

Referring to FIG. 4 again, by including the general-purpose engine 410 instead of various types and versions of codecs, the reproducing apparatus according to the present embodiment of the invention also has the advantage of a reduced production cost. The reproducing apparatus according to the present embodiment of the invention needs only a single general-purpose engine 410 for all media contents, local contents, and remote contents. Because multimedia contents themselves include a codec, it is not necessary to upgrade codecs, and even when a new type of a codec is introduced, multimedia contents complying with the new type can be smoothly reproduced without changing the reproducing apparatus.

Figure 5:
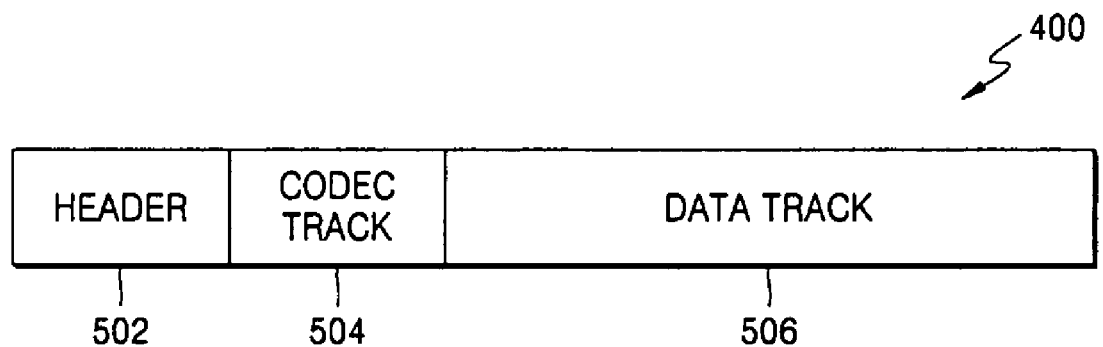
FIG. 5 is a diagram showing an example of the structure of a bitstream of multimedia contents according to the present invention.

More specifically, FIG. 5 is a diagram showing an example of the structure of a bitstream of multimedia contents according to the present invention.

Referring to FIG. 5, the self-playable multimedia contents 400 according to the present embodiment of the invention preferably, but not necessarily, includes a header 502, a codec track 504, and a data track 506.

The header 502 may include information on characteristics of a coupled codec, information required when the self-playable multimedia contents 400 are read by the general-purpose engine 410, and restriction information. The codec track 504 includes an execution code of a codec to decode multimedia contents. The execution code of the codec can be implemented in the form of an executable binary code or an interpretable script. For example, as a binary format optimized on a predetermined platform, execution codes in the form of win32executable can be included. Also, an execution code in the form of a script language describing the operation of the codec can be included. Furthermore, in response to a variety of processors or operating systems, a codec can be implemented on a platform by using an independent language such as Java, and a Java virtual machine (hereinafter referred to as a "JVM") can be installed in the general-purpose engine 410 of the reproducing apparatus. In this case, any type and version of multimedia contents can be reproduced on a variety of platforms such as x86 PC Windows, x86 PC Linux, VxWorks, and WinCE.

Thus, since self-playable multimedia contents according to the present embodiment of the invention already have all information required for decoding, the general-purpose engine 410 loads the codec in the codec track in the memory by referring to the contents of the header, and then, by using this, reproduces multimedia contents in the data track. In this way, a variety of compatibility problems can be solved.

Figure 6:
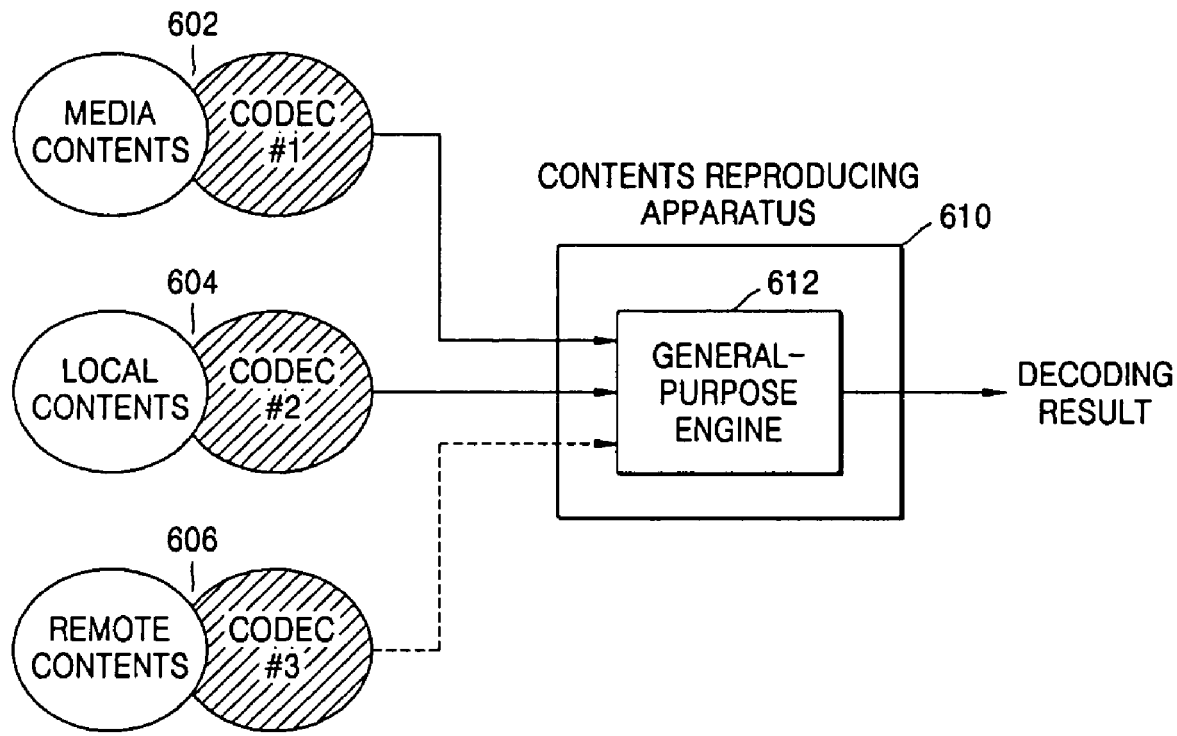
FIG. 6 is a diagram showing an apparatus for reproducing multimedia contents according to an exemplary embodiment of the present invention.

FIG. 6 is a diagram showing an apparatus for reproducing multimedia contents according to an exemplary embodiment of the present invention.

Referring to FIG. 6, a reproducing apparatus 610 according to the present invention, capable of reproducing various types and versions of multimedia contents, has a general-purpose engine 612. The general-purpose engine 612 loads a codec into memory from multimedia content coupled with the corresponding codec, and decodes the multimedia contents by executing the loaded codec. The result of decoding is output through an output apparatus such as a display apparatus (not shown). As described above, the multimedia contents include media contents 602 recorded on a storage medium, local contents 604 stored in a local storage, or remote contents 606 stored in a storage at a remote location. Each of the contents has in itself a codec appropriate for the types or versions of multimedia contents or the standard method coupled with the multimedia contents. As described above, the codec can be implemented by an executable binary code or a script language describing the operation of the codec.

Figure 7:
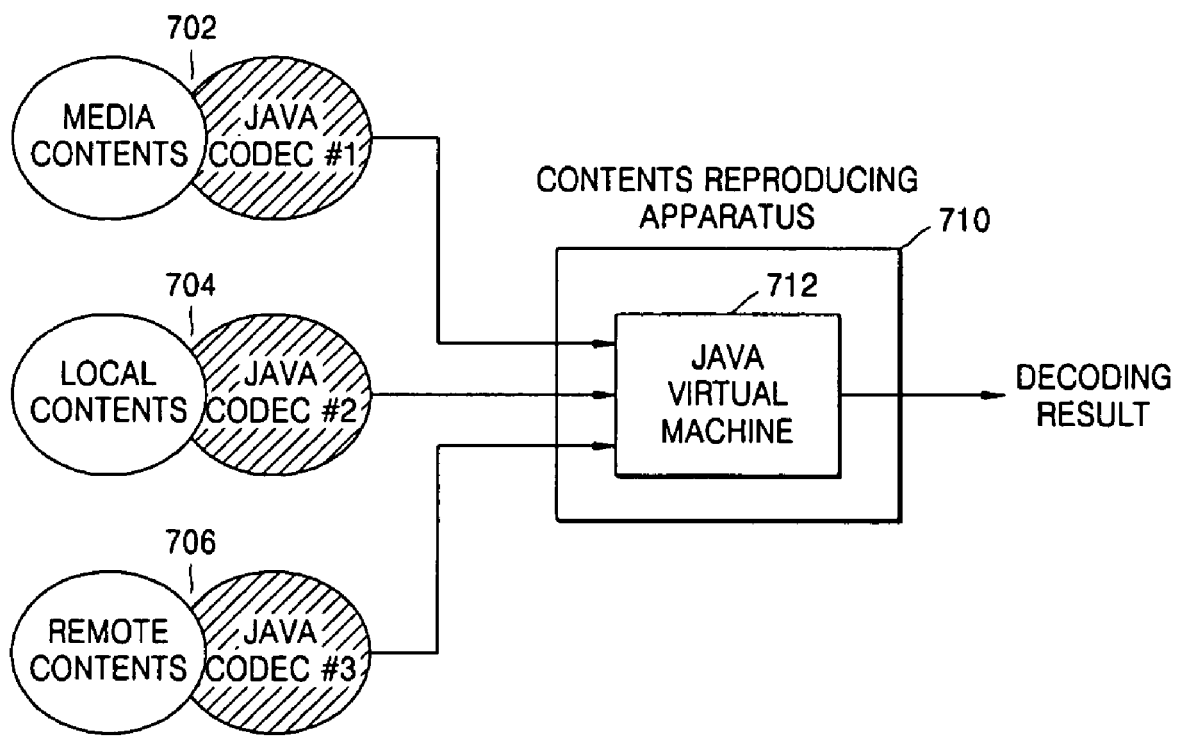
FIG. 7 is a diagram showing an apparatus for reproducing multimedia contents implemented by Java according to an exemplary embodiment of the present invention.

In particular, FIG. 7 is a diagram showing an apparatus for reproducing multimedia contents implemented by Java according to an embodiment of the present invention.

Referring to FIG. 7, a reproducing apparatus 710 reproduces multimedia contents 702 through 706 coupled with Java codecs implemented by using Java script language. The reproducing apparatus 710 according to the present invention has a JVM 712 that executes a Java codec implemented by using Java script language. Accordingly, regardless of the platform or operating system of the reproducing apparatus, various types or versions of multimedia contents can be smoothly reproduced.

Figure 8:
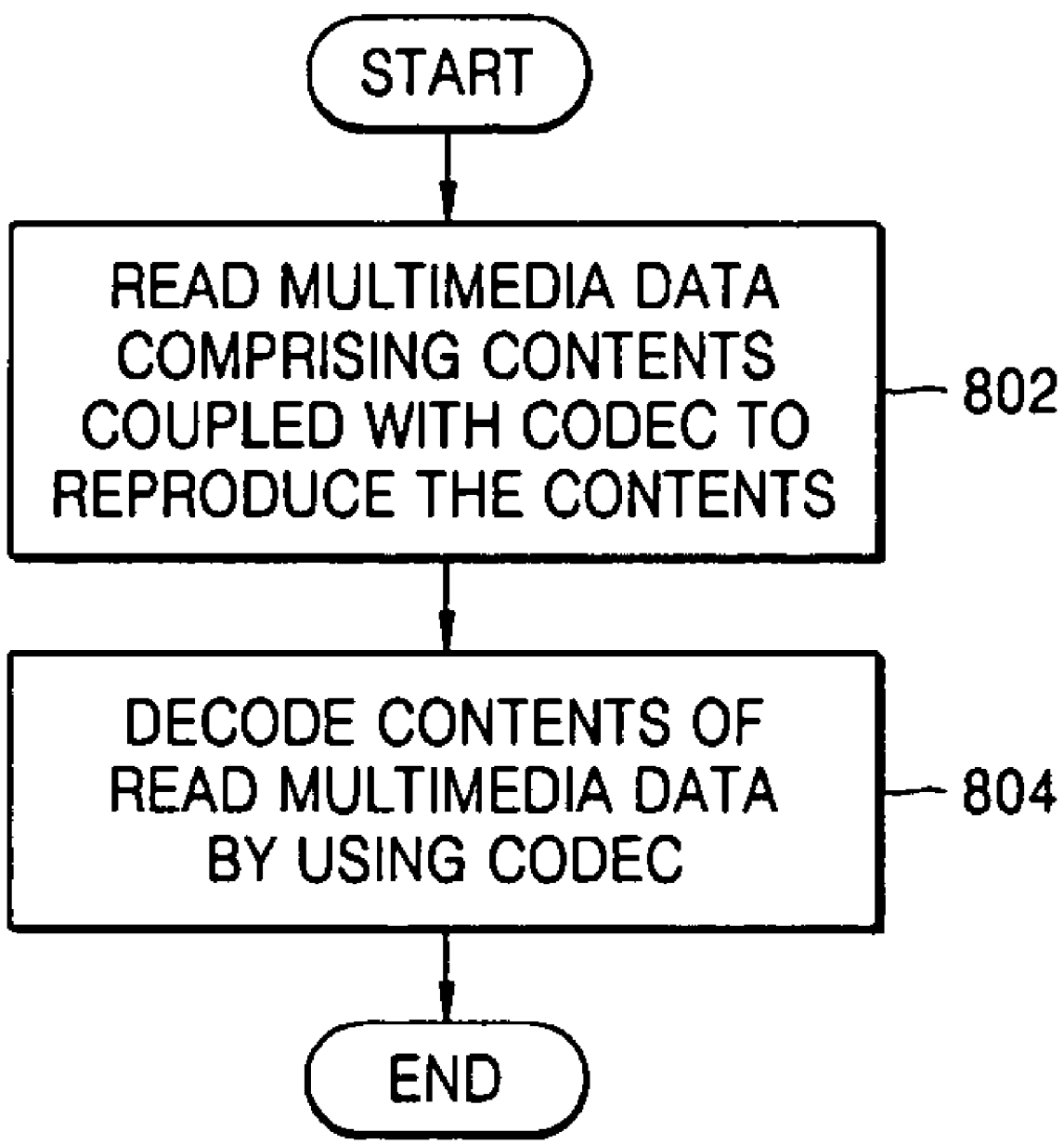
FIG. 8 is a flowchart of a method of reproducing multimedia contents according to an exemplary embodiment of the present invention.

FIG. 8 is a flowchart of a method of reproducing multimedia contents according to an embodiment of the present invention.

Referring to FIG. 8, in order to smoothly reproduce multimedia contents regardless of their type and version, according to the present invention, multimedia data in which multimedia contents are coupled with a codec to reproduce the contents is read in step 802.

The multimedia data includes a header containing information on the characteristic of the codec, the codec to decode the multimedia contents, and contents data to be actually reproduced.

Also, with respect to the type of the reproducing apparatus, multimedia data can be read from a storage medium such as, for example, an optical disc, a local storage of a desktop PC, a notebook PC, or a PDA, or a storage in a remote location through a network.

By referring to header information included in the read multimedia data, the codec is loaded into memory, and multimedia contents are decoded by using the loaded codec in step 804. The decoded result is output through any of various output apparatuses (not shown).

Meanwhile, an apparatus and method for generating multimedia contents according to the present invention follow the same principle as the decoding structure of the present invention.

As described with reference to FIG. 5, the multimedia content generation apparatus according to an exemplary embodiment of the present invention encodes multimedia data to be reproduced by using an appropriate codec, records the encoded data in the data track 506, records the codec used to encode the data in the codec track 504, and records information on characteristics of the recorded codec in the header 502. In this way, multimedia contents can be generated according to the bitstream format. Thus generated multimedia contents can be reproduced by using the codec included in the contents themselves, regardless of the type and version of a reproducing apparatus.

Also, thus generated multimedia contents can be stored in a storage medium such as an optical disc and distributed, or can be stored in a local storage of a computer such as a desktop PC, a notebook PC, or a PDA, or can be downloaded to the reproducing apparatus described above through a server in a remote location or through computers connected by a peer-to-peer (P2P) network, and reproduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention as described above, an apparatus and method for reproducing multimedia contents regardless of the type and version of a codec, an apparatus and method for generating multimedia contents, and a storage medium storing multimedia contents, are provided.

Regardless of a codec upgrade or introduction of a new codec with a new method, various types of multimedia contents can be smoothly reproduced. Also, even in a reproducing apparatus not linked to a network, multimedia contents can be reproduced regardless of the type and version of a codec.

What is claimed is:

1. A multimedia reproducing apparatus comprising:
   a reading unit which reads multimedia data comprising multimedia contents coupled with a codec for decoding the multimedia contents, from a storage medium; and
   a reproducing unit which reproduces the multimedia contents by extracting and using the codec from the read multimedia data,
   wherein the multimedia data further comprises a header in which information on characteristics of the codec is recorded, and the reproducing unit comprises a general-purpose engine which executes the codec with reference to the header regardless of a type of a platform or operating system, and
   wherein the general-purpose engine decodes the multimedia contents by loading the codec in the storage medium into memory by referring to the header included in the read multimedia data and executing the codec.

2. The multimedia reproducing apparatus of claim 1, wherein the storage medium includes at least one of an optical disc, local storage, and remotely located storage.

3. The multimedia reproducing apparatus of claim 1, wherein the codec is implemented by a binary code or a script language describing the operation of the codec.

4. The multimedia reproducing apparatus of claim 3, wherein the script language includes Java language, and the general-purpose engine is a Java virtual machine executing the codec implemented by Java regardless of the type of a platform or operating system.

5. The multimedia reproducing apparatus of claim 1, wherein the multimedia reproducing apparatus is any one of a DVD player, a PC, a notebook computer, a personal digital assistant (PDA), and a consumer electronics (CE) product.

6. The multimedia reproducing apparatus of claim 1, wherein the header is coupled with the codec and the multimedia contents.

7. The multimedia reproducing apparatus of claim 1, wherein the multimedia contents includes the codec for decoding the multimedia contents.

8. A multimedia reproducing method comprising:
reading multimedia data comprising multimedia contents coupled with a codec for decoding the multimedia contents, from a storage medium; and
reproducing the multimedia contents by using the codec extracted from the read multimedia data,
wherein the multimedia data further comprises a header in which information on characteristics of the codec is recorded, and wherein the reproducing the multimedia contents comprise reproducing the multimedia contents by using a general-purpose engine which executes the codec with reference to the header regardless of a type of a platform or operating system, and
wherein the general-purpose engine decodes the multimedia contents by loading the codec in the storage medium into memory by referring to the header included in the read multimedia data and executing the codec.

9. The multimedia reproducing method of claim 8, wherein the storage medium includes at least one of an optical disc, local storage, and remotely located storage.

10. The multimedia reproducing method of claim 8, wherein the codec is implemented by a binary code or a script language describing the operation of the codec.

11. The multimedia reproducing method of claim 10, wherein the script language includes Java language, and in reproducing the multimedia contents, the codec implemented by Java regardless of the type of a platform or operating system is executed.

12. The multimedia reproducing method of claim 8, wherein the multimedia data is reproduced by any one of a DVD player, a PC, a notebook computer, a PDA, and a CE product.

13. A multimedia generating apparatus comprising:
a contents generation unit which encodes multimedia contents by using a codec; and
a recording unit which records multimedia data comprising the multimedia contents coupled with the codec, in a storage medium,
wherein the multimedia data further comprises a header in which information on characteristics of the codec is recorded, wherein the multimedia contents is reproduced by a general-purpose engine which executes the codec with reference to the header regardless of the type of a platform or operating system, and
wherein the general-purpose engine decodes the multimedia contents by loading the codec in the storage medium into memory by referring to the header and executing the codec.

14. The multimedia generating apparatus of claim 13, wherein the storage medium includes at least one of an optical disc, local storage, and remotely located storage.

15. The multimedia generating apparatus of claim 13, wherein the codec is implemented by a binary code or a script language describing the operation of the codec.

16. The multimedia generating apparatus of claim 15, wherein the script language includes Java language, and the contents generation unit executes the codec implemented by Java regardless of the type of a platform or operating system.

17. A multimedia generating method comprising:
encoding multimedia contents by using a codec; and
recording multimedia data comprising the multimedia contents coupled with the codec in a storage medium,
wherein the multimedia data further comprises a header in which information on characteristics of the codec is recorded, and wherein the multimedia contents is reproduced by a general-purpose engine which executes the codec with reference to the header regardless of the type of a platform or operating system, and
wherein the general-purpose engine decodes the multimedia contents by loading the codec in the storage medium into memory by referring to the header and executing the codec.

18. A non-transitory computer-readable multimedia storage medium comprising:
multimedia data including multimedia contents coupled with a codec; and
information on characteristics of the codec, as a header,
wherein the multimedia contents are reproduced by a general-purpose engine which executes the codec with reference to the header regardless of a type of a platform or operating system, and
wherein the general-purpose engine decodes the multimedia contents by loading the codec in the storage medium into memory by referring to the header and executing the codec.

* * * * *